(12) United States Patent
Laperle et al.

(10) Patent No.: US 8,162,091 B2
(45) Date of Patent: Apr. 24, 2012

(54) SYSTEM FOR MOUNTING A BOX OR BAG TO A VEHICLE

(75) Inventors: Maxime Laperle, Sherbrooke (CA); Simon Marcouiller, St-Barnabe Nord (CA)

(73) Assignee: Bombardier Recreational Products Inc., Valcourt (CA)

( * ) Notice: Subject to any disclaimer, the term of this patent is extended or adjusted under 35 U.S.C. 154(b) by 240 days.

(21) Appl. No.: 12/550,650

(22) Filed: Aug. 31, 2009

(65) Prior Publication Data

US 2011/0049205 A1  Mar. 3, 2011

(51) Int. Cl.
*B62D 61/02* (2006.01)
(52) U.S. Cl. ..................................... 180/219; 280/288.4
(58) Field of Classification Search .................. 180/219; 280/288.4, 291, 292, 296, 304.3; 224/413, 224/419, 425, 426, 429, 441, 430, 442, 435
See application file for complete search history.

(56) References Cited

U.S. PATENT DOCUMENTS

| | | | | |
|---|---|---|---|---|
| 4,195,757 A * | 4/1980 | Jefferson | ...................... | 224/414 |
| 4,480,773 A * | 11/1984 | Krauser | ........................ | 224/443 |
| 5,025,883 A * | 6/1991 | Morinaka et al. | ............. | 180/219 |
| 5,558,260 A * | 9/1996 | Reichert | ....................... | 224/413 |
| 5,762,249 A * | 6/1998 | Hann | ............................ | 224/430 |
| 6,234,266 B1 * | 5/2001 | Saiki | ............................. | 180/219 |
| 6,659,566 B2 * | 12/2003 | Bombardier | ............... | 298/22 R |
| 7,036,837 B1 | 5/2006 | Bauer et al. | | |
| 7,278,560 B2 * | 10/2007 | Aron | ............................. | 224/413 |
| 7,311,232 B2 | 12/2007 | Watanabe et al. | | |
| 7,686,318 B2 * | 3/2010 | Kouchi et al. | ................ | 280/291 |
| 7,823,677 B2 * | 11/2010 | Minami et al. | ............... | 180/219 |
| 2005/0040196 A1 * | 2/2005 | Dean | ............................ | 224/413 |
| 2006/0077676 A1 * | 4/2006 | Ohzono | ....................... | 362/473 |

FOREIGN PATENT DOCUMENTS

| | | |
|---|---|---|
| DE | 8811793 U1 | 1/1989 |
| DE | 29905852 U1 | 9/1999 |
| EP | 0245541 A2 | 11/1987 |
| GB | 757420 | 9/1956 |
| GB | 1590141 | 5/1981 |
| JP | 2002068052 | 3/2002 |

OTHER PUBLICATIONS

English Abstract of JP2002068052; Published on Mar. 8, 2002.
English Abstract of EP0245541; Published on Nov. 19, 1987.
English Abstract Translation of German Utility Patent No. DE29905852; done by Thomas Goeritz; Apr. 9, 2010.
English Translation of First Paragraph of German Utility Patent No. DE8811793; done by Thomas Goeritz; Apr. 9, 2010.

* cited by examiner

*Primary Examiner* — Tashiana Adams
(74) *Attorney, Agent, or Firm* — Osler, Hoskin & Harcourt LLP

(57) ABSTRACT

A vehicle comprising a frame having a front portion and a rear portion. An engine is supported by the frame. At least two wheels are connected to the frame, and at least one of the at least two wheels is operatively connected to the engine to propel the vehicle. A steering assembly is supported by the frame and is operatively connected to at least one of the at least two wheels to steer the vehicle. Intermediate brackets are connected to the rear portion of the frame. A rack has rack brackets. At least one of the rack brackets is removably connected to the intermediate brackets for removably connecting the rack to the rear portion of the frame. The rack is adapted to attach at least one of a cargo box and a bag to the vehicle. A kit for mounting a cargo box to a vehicle is also described.

19 Claims, 8 Drawing Sheets

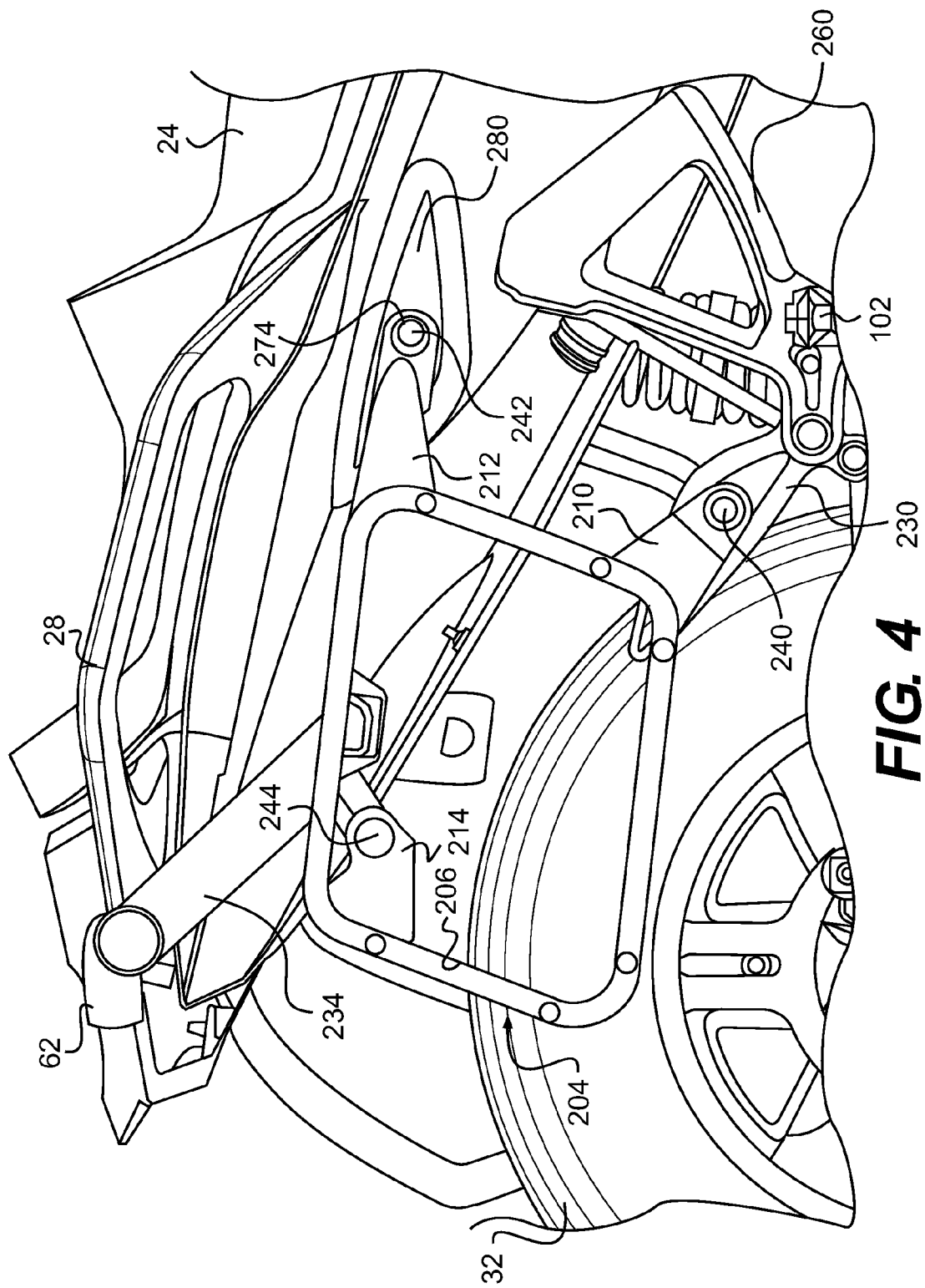

SYSTEM FOR MOUNTING A BOX OR BAG TO A VEHICLE

FIELD OF THE INVENTION

The present invention relates to a system for mounting a box or bag to a vehicle, more specifically to a straddle-type wheeled vehicle.

BACKGROUND OF THE INVENTION

Typical three-wheel vehicles having a single rear wheel and a pair of front wheels are based on a motorcycle-like design and include a frame onto which all mechanical, electrical and fairing or bodywork components are mounted. The frame typically extends from the rear suspension of the vehicle to the front portion or nose of the vehicle beyond the front wheels and front suspension of the vehicle. Bodywork panels are mounted to the frame to give the vehicle an aesthetically pleasing look. Because motorcycles and motorcycle-like vehicles typically do not have a trunk, a pair of cargo boxes (or saddle bags) are sometimes used for carrying various items. The cargo boxes are typically mounted to the frame at the rear of the vehicle, one cargo box on each side of the vehicle.

Some models of motorcycles come with the cargo boxes already mounted on the frame of the vehicle, while other models have optional cargo boxes available as an add-on kit for mounting the cargo boxes. The add-on kit usually comprises a rack on which the cargo box is to be mounted and fasteners to connect the rack to the frame. The kit may also include the cargo box. Some vehicles, however, have not been designed for accommodating the cargo boxes and the mounting racks, and for these vehicles the available kits can be difficult to adapt.

The rack on which the cargo box (or saddle bag) is mounted, is typically secured directly to the frame by fasteners. In some cases the mounting system has been designed for being removable when the cargo box is not being used. A user who has a removable mounting system and who does not wish to ride with the cargo box has to remove the cargo box from the rack and then remove the rack from the frame. When the mounting system has not been designed for being removable, the rack has to stay on the vehicle when the cargo box is removed from the rack, which leaves an unpleasant look to the vehicle.

In both cases, the mounting system can be difficult to remove. When the rack is not designed to be removable, trying to remove the rack from the frame can damage the mounting system. When the rack is removable, the fasteners are hard to access and a user typically experience difficulties when disassembling the mounting system.

In all the above described configurations, the difficulty of mounting as well as the parts of the mounting system that remain exposed when the cargo boxes are removed from the vehicle do not satisfy users of the vehicle.

Therefore, there is a need for a mounting system that would allow for a more aesthetically pleasing look when the cargo boxes are not mounted onto a vehicle.

There is also a need for an easy system for mounting a rack onto a frame of the vehicle as part of a mounting system for a cargo box.

Finally, there is a need for a kit for mounting a cargo box onto a vehicle.

SUMMARY OF THE INVENTION

It is an object of the present invention to ameliorate at least some of the inconveniences mentioned above.

It is also an object of the present invention to provide removable brackets for removably mounting a rack to the frame of the vehicle, the rack being adapted for mounting a cargo box or a saddle bag.

It is another object of the invention to provide a rack which connects to the frame of the vehicle at three attachment points, one of the attachment point being connected to a foot peg holder and another attachment point being associated with a turn signal holder.

It is an additional object of the invention to provide a kit for mounting a cargo box or a saddle bag onto a frame of a vehicle.

In one aspect, the invention provides a kit for mounting at least one of a cargo box and a bag to a vehicle. The kit comprises a rack having a support member and at least first, second, and third rack brackets attached to the support member. The first rack bracket is adapted to connect to a foot peg holder. The third rack bracket is adapted to connect to a turn signal holder. The kit also comprises at least two fasteners for fastening the first rack bracket to the foot peg holder and third rack bracket to the turn signal holder.

In an additional aspect, the second rack bracket is adapted to connect directly to the frame.

In a further aspect, the second rack bracket is adapted to connect to a bracket connected to the frame.

In an additional aspect, the kit further comprises first, second and third intermediate brackets adapted to connect the first, second, and third rack brackets. The first intermediate bracket is adapted to connect the first rack bracket to the foot peg holder. The third intermediate bracket is part of the turn signal holder.

In a further aspect, the second intermediate bracket is adapted to connect the second rack bracket directly to the frame.

In an additional aspect, the second intermediate bracket is adapted to connect the second rack bracket to the first intermediate bracket.

In a further aspect, the kit further comprises a cover to be mounted to the vehicle. The cover has an aperture such that when the kit is mounted to the vehicle. The second rack bracket passes at least in part through the aperture to connect to the second intermediate bracket disposed behind the cover.

In an additional aspect, the kit further comprises at least three quarter-turn fasteners for connecting the first, second, and third rack brackets to the first, second, and third intermediate brackets.

In another aspect, the invention provides a vehicle comprising a frame having a front portion and a rear portion. An engine is supported by the frame. At least two wheels are connected to the frame. At least one of the at least two wheels is operatively connected to the engine to propel the vehicle. A steering assembly is supported by the frame and being operatively connected to at least one of the at least two wheels to steer the vehicle. Intermediate brackets are connected to the rear portion of the frame. A rack is removably connected to the intermediate brackets for removably connecting the rack to the rear portion of the frame. The rack is adapted to attach at least one of a cargo box and a bag to the vehicle.

In an additional aspect, at least one of the intermediate brackets is removably connected to the frame.

In a further aspect, at least one of the intermediate brackets is permanently connected to the frame.

In an additional aspect, the vehicle further comprises one of a cargo box and a bag attached on the rack. The one of the cargo box and the bag has a lock for locking the at least one of the cargo box and the bag on the rack.

In a further aspect, the intermediate brackets comprise first, second and third intermediate brackets. The vehicle further comprises a cover having an aperture, a portion of the rack being received at least in part in the aperture to connect to one of the intermediate brackets disposed behind the cover.

In an additional aspect, the intermediate brackets comprise first, second and third intermediate brackets. The first intermediate bracket is connected to a foot peg holder. The second intermediate bracket is directly connected to the frame. The third intermediate bracket is part of a turn signal holder. The rack is connected to at least one of the first, second, and third intermediate brackets by at least a quarter-turn fastener.

In a further aspect, the intermediate brackets comprise first, second and third intermediate brackets. The first intermediate bracket is connected to a foot peg holder. The second intermediate bracket is directly connected to the first intermediate bracket. The third intermediate bracket is part of a turn signal holder. The rack is connected to at least one of the first, second, and third intermediate brackets by at least a quarter-turn fastener.

In an additional aspect, the vehicle further comprises one of a cargo box and a bag attached on the rack. The one of the cargo box and the bag is disposed in front of at least one of the quarter-turn fasteners to prevent access to the at least one of the quarter-turn fasteners.

In yet an other aspect, the invention provides a vehicle comprising a frame having a front portion and a rear portion. An engine supported by the frame. At least two wheels are connected to the frame. At least one of the at least two wheels is operatively connected to the engine to propel the vehicle. A steering assembly is supported by the frame and is operatively connected to at least one of the at least two wheels to steer the vehicle. A straddle seat is disposed on the frame. A turn signal holder is connected to the rear portion of the frame. A turn signal is connected to the turn signal holder. A foot peg holder is mounted on the frame rearwardly of the steering assembly and vertically lower than the turn signal holder. A foot peg is connected to the foot peg holder. A rack for one of a cargo box and a bag is removably connected to the rear portion of the frame at least first and second attachment points, and the first attachment point being associated with the turn signal holder.

In an additional aspect, the second attachment point is associated with the foot peg holder.

In a further aspect, the rack further comprises at least first, second rack brackets. The first rack bracket is connected to the turn signal holder at the first attachment point. The second rack bracket is connected to the foot peg holder at the second attachment point.

In an additional aspect, the vehicle further comprises a cover having an aperture. The rack has a third rack bracket. The third rack bracket passes at least in part through the aperture to connect to one of the frame and the foot peg holder at a third attachment point located behind the cover.

For the purpose of this application, terms related to spatial orientation such as downwardly, rearwardly, forward, front, rear, left, and right, are as they would normally be understood by a driver of the vehicle sitting therein in a normal driving position.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 4 is a close-up right side elevation view of a rack for mounting a saddle bag according to the present invention mounted on the vehicle of FIG. 1;

DETAILED DESCRIPTION OF THE PREFERRED EMBODIMENTS

The present invention will be described with respect to a three-wheel vehicle. However, it should be understood that other types of straddle-type vehicles such as road and off-road motorcycles are also considered. The following description refers to cargo boxes but it should be understood that saddle bags and other types of carrying devices are also contemplated.

Figure 1:
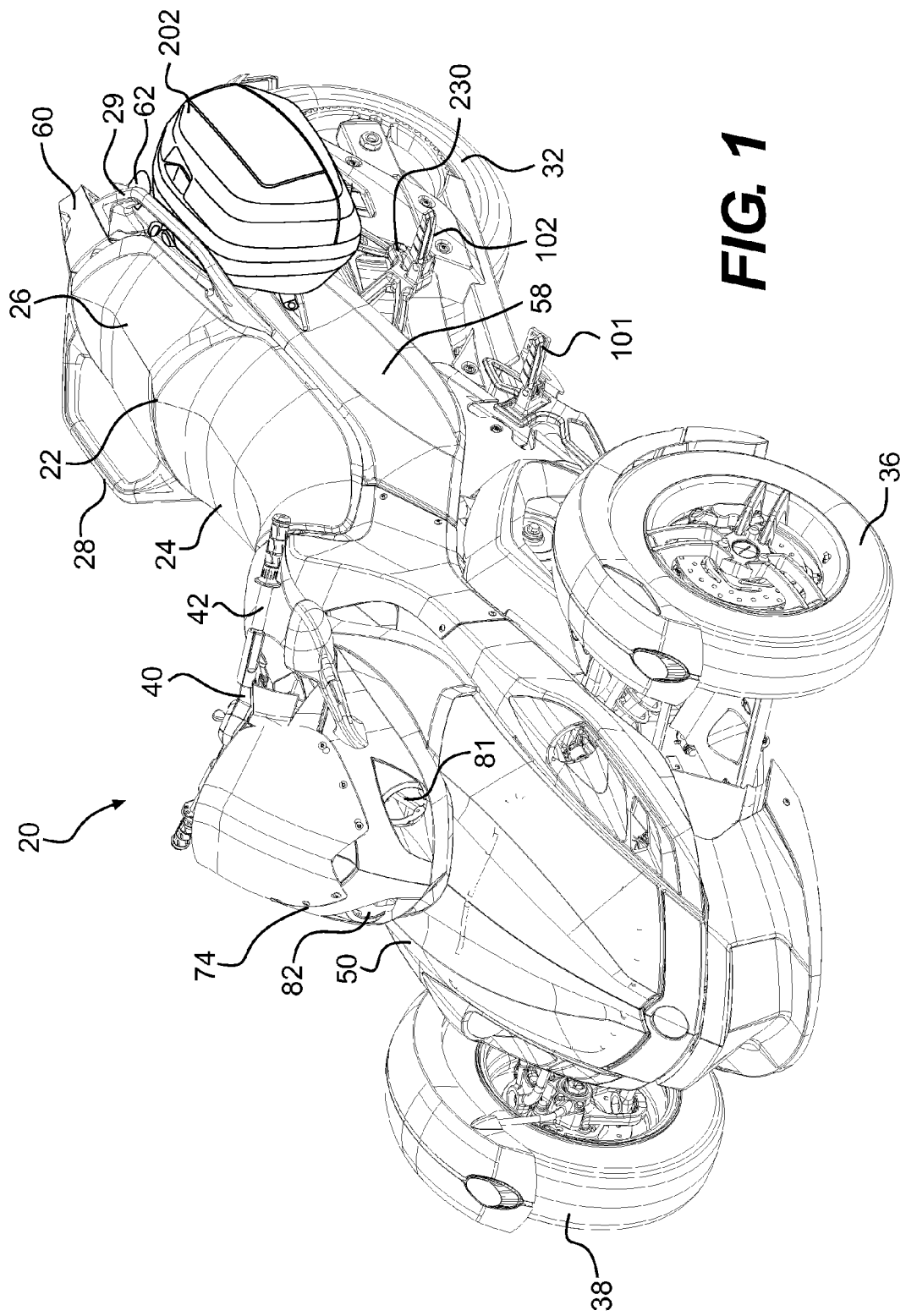
FIG. 1 is a front left perspective view of a three-wheel vehicle according to the present invention.
Figure 2:
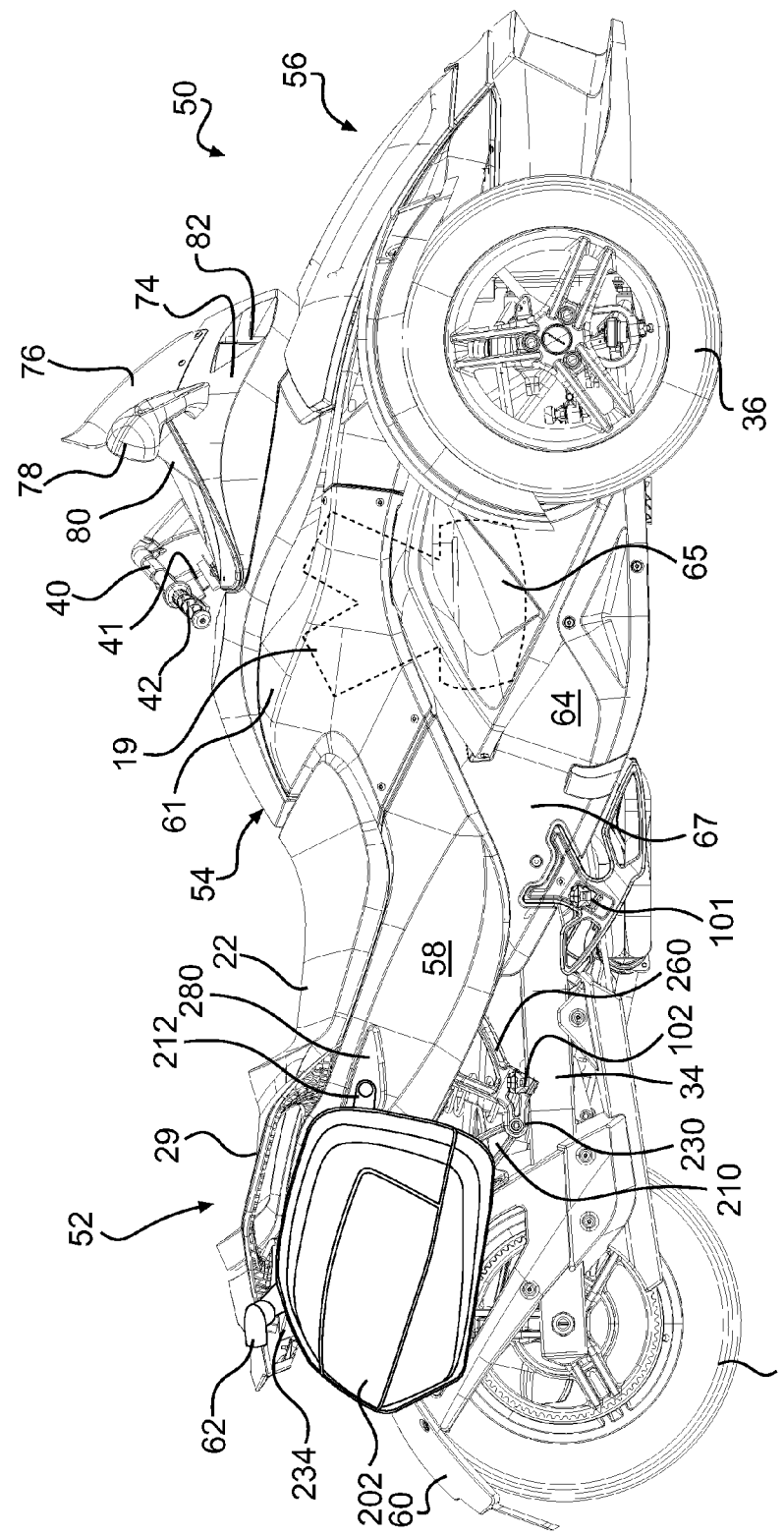
FIG. 2 is a right side elevation view of the three-wheel vehicle of FIG. 1.
Figure 3:
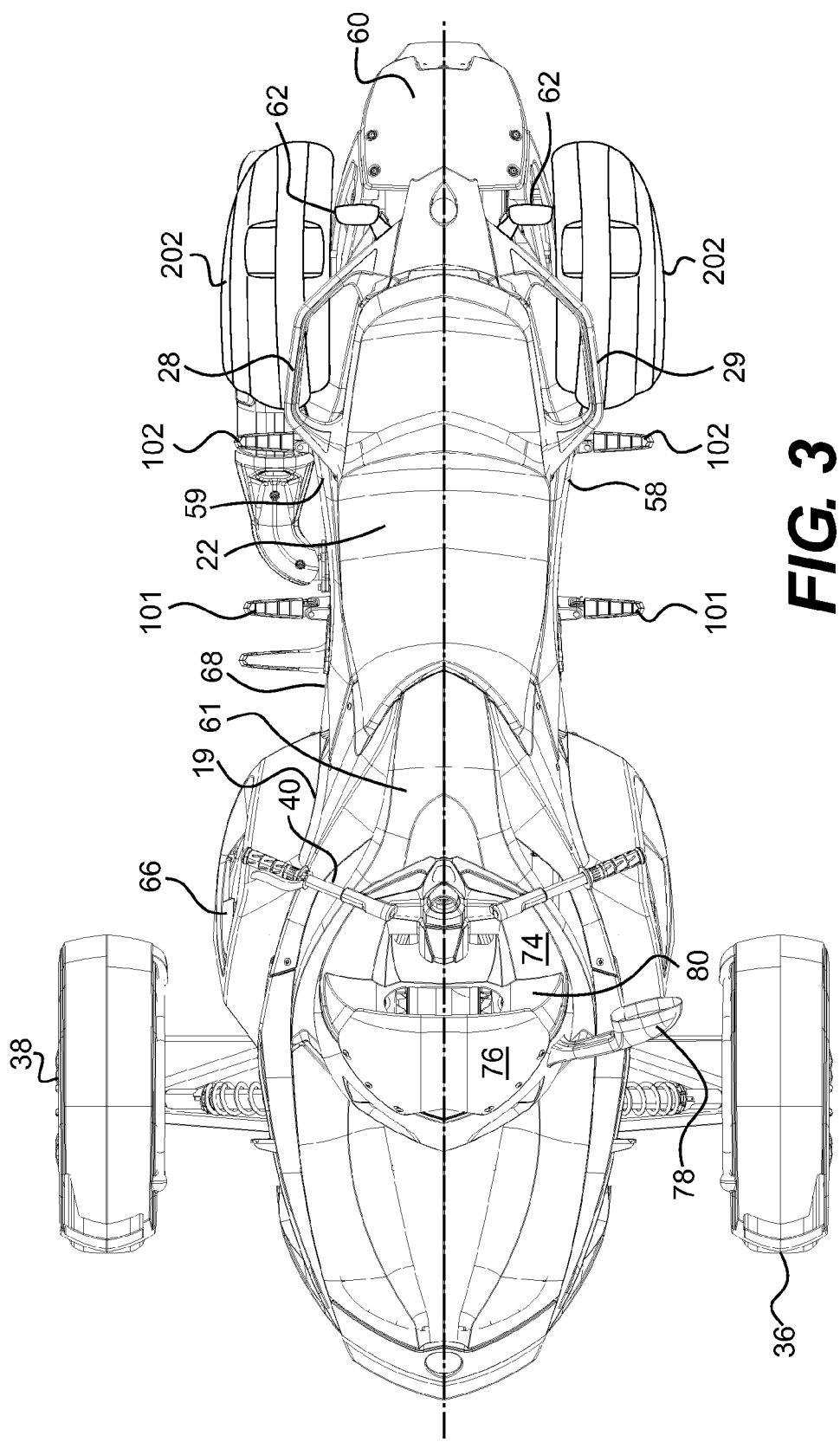
FIG. 3 is a top plan view of the three-wheel vehicle of FIG. 1.

FIGS. 1 to 3 illustrate a three-wheel vehicle 20 in accordance with one embodiment of the invention. The three-wheel vehicle 20 is a straddle-type vehicle comprising a straddle seat 22 adapted to accommodate one or two adult sized riders. The straddle seat 22 includes a forward seat portion 24 for the driver and a rear seat portion 26 for a passenger. A pair of handles 28 and 29 are provided on both sides of the rear seat segment 26 for the passenger sitting therein to grip with his hands to maintain his balance. A pair of foot pegs 101 (one foot peg on each side of the three-wheel vehicle 20) and a pair of foot pegs 102 (one foot peg on each side of the three-wheel vehicle 20) are used by the driver and the passenger respectively, for resting their feet onto during riding. It is contemplated that the three-wheel vehicle 20 could not have the rear seat portion 26, and be adapted to accommodate only the driver and that accordingly the three-wheel vehicle 20 would not have the handles 28 and 29 and would have only the pair of foot pegs 101.

Figure 7:
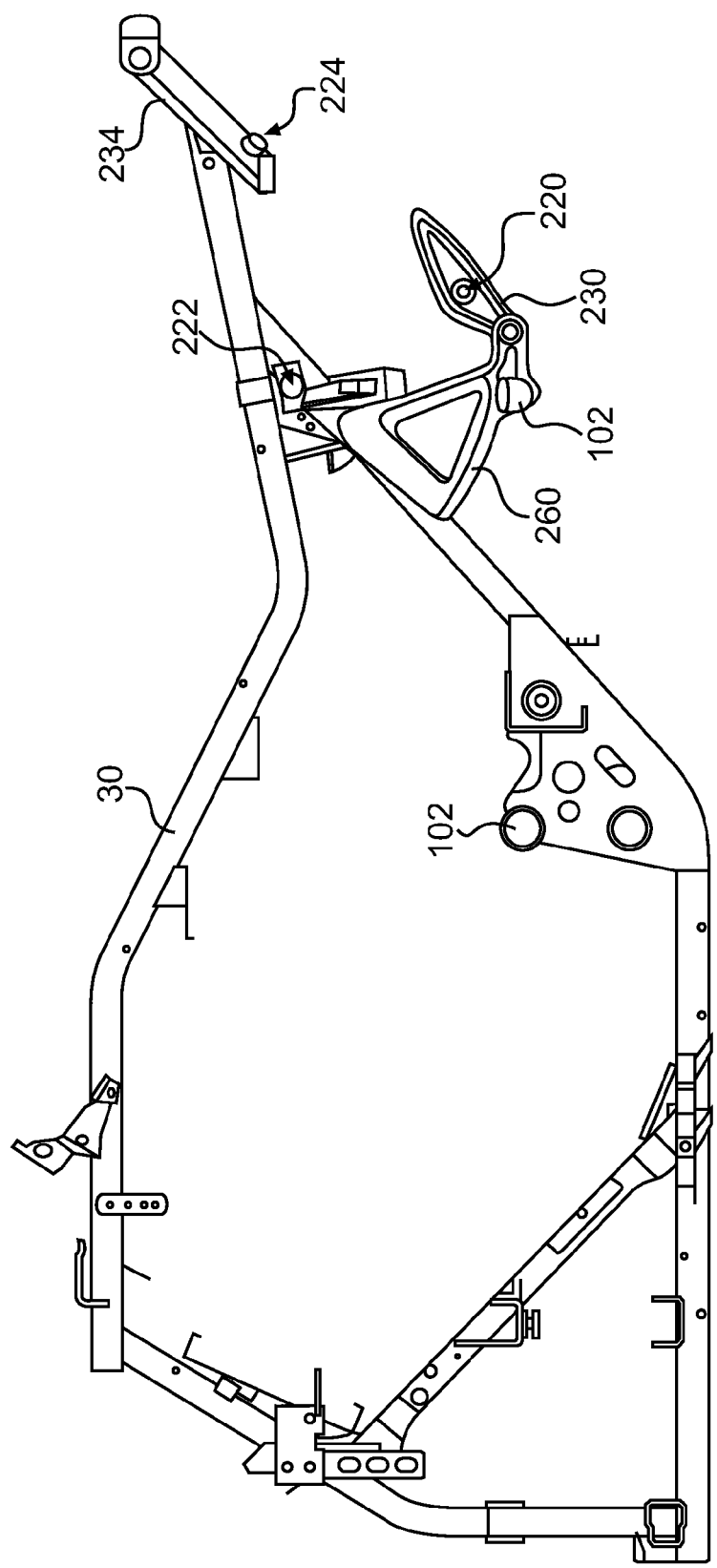
FIG. 7 is a left side elevation view of the frame of the vehicle of FIG. 1 showing attachment points of the mounting system of FIG. 6 onto the frame.

The three-wheel vehicle 20 includes a frame 30 (as seen in FIG. 7) underneath the general bodywork 50 of the vehicle 20 that supports and houses an engine 19 located between the straddle seat 22 and the front wheel assemblies 36 and 38.

Engine 19 could be any type of power source such as an internal combustion engine or an electric motor if desired. A single rear wheel assembly 32 with a tire suitable for road use is suspended from the vehicle 20 via a rear suspension system 34 at the rear of the frame 30. The single rear wheel assembly 32 is operatively connected to the engine 19 through any suitable power transmission mechanism such as a gearbox or continuously-variable transmission coupled to an endless belt, chain, or driveshaft assembly. The pair of front wheel assemblies 36 and 38 are suspended from the front of the frame 30 through a suitable suspension assembly such as upper and lower A-arms. Dampening mechanisms such as shock absorber and coil spring assemblies are connected to the suspension assembly to increase ride comfort and vehicle stability. The front wheel assemblies 36 and 38 have road tires mounted thereon.

A steering assembly 40 is coupled to the front wheel assemblies 36 and 38 and is supported by the frame 30 for transmitting steering commands to the front wheel assemblies 36 and 38. The steering assembly 40 includes a steering column 41 and a steering control mechanism 42, such as a handle bar, steering wheel, or other known steering control mechanism.

The elaborate bodywork 50 covers the mechanical components of the three-wheel vehicle 20. Bodywork 50 includes a rear portion 52, a central portion 54 and a front portion 56. The rear portion 52 consists of the straddle seat 22, the handles 28 and 29, fairing side panels 58 and 59 disposed below and on each side of straddle seat 22, a pair of rear turn signals 62 and a rear deflector 60 to prevent ingress of debris or water thrown by the rear wheel assembly 32. The central portion 54 consists of an upper fairing 61 extending from the forward end of the straddle seat 22 to the steering assembly 40 and extending downwardly on both sides of vehicle 20 to cover the top portion of the engine 19. The upper fairing 61 extends rearward to merge with the side panels 58 and 59 below straddle seat 22. The central portion 54 also features a lower fairing 64 consisting of a left cover 65 and a right cover 66 and lower side panels 67 and 68 extending from the covers 65 and 66 respectively towards the rear of the vehicle 20 to merge with the side panels 58 and 59. The left cover 65 protects the radiator of the vehicle whereas the right cover 66 protects the oil cooler of the vehicle 20. The covers 65 and 66 also enclose the lower portion of the engine 19 and the lower side panels 67 and 68 enclose the attachment points of the rear suspension 34. The front facing portion of the covers 65 and 66 includes air intake openings (not shown) adapted to scoop and direct air towards the radiator and oil cooler to provide sufficient air flow for efficient heat exchange. The central portion 54 also includes an upper segment 74 surrounding the steering assembly 40 to which is mounted a windshield 76, at least one side view mirror 78 and a dashboard panel 80 for mounting various gauges and indicators. The upper segment 74 includes a pair of headlights 81 and 82. The upper segment 74 of the central portion 54 extends from the upper fairing 61 to the front portion 56 of the bodywork 50 to enclose the steering column 41. All the elements of the rear and central portions 52 and 54 of bodywork 50 are typically secured directly onto the frame 30.

A pair of removable cargo boxes 202 are mounted to a rear of the three-wheel vehicle 20 behind the pair of foot pegs 102, generally aligned with the rear wheel assembly 32. For simplicity, only one cargo box 202 and a corresponding mounting system will be described, since the other cargo box 202 and mounting system are a mirror image thereof.

The cargo box 202 has a hard case which is sized to fit at a rear of the vehicle 20. The cargo box 202 is adapted to carry various items during riding. The hard case prevents the items from being damaged as well as from becoming wet during rainy driving conditions. It is contemplated that the cargo box 202 could be a soft case saddle bag 201 (such as shown in FIG. 5B), or being of another shape. The cargo box 202 is mounted to the three-wheel vehicle 20 by a mounting system discussed in greater details below.

Referring now to FIG. 4, a rack 204 for supporting the cargo box 202 will be described. The rack 204 comprises a generally parallelogram-shaped support member 206 (as seen from a side view of the three-wheeled vehicle 20) on which the removable cargo box 202 is secured. It is contemplated that the support member 206 could have other shapes such as a square, a rectangle, or a trapezoid. As seen from a front view of the three-wheeled vehicle 20, the support member 206 has a S-shape for accommodating the general shape of the rear of the three-wheel vehicle 20. The support member 206 is slightly smaller than the cargo box 202 in order to be hidden behind the cargo box 202 when the cargo box 202 is mounted on the rack 204, thus providing an aesthetically pleasing appearance when the cargo box 202 is mounted on the rack 204.

The removable cargo box 202 (or saddle bag 201) is attached to a top of the rack 204 by a locking mechanism 274 (shown in FIGS. 5A and 6), and is attached to a bottom of the rack 204 by a bracket (not shown) for added support. It is contemplated that secondary brackets or other fasteners could additionally secure the cargo box 202 onto the sides of the rack 204. The locking mechanism 274 is part of the cargo box 202 and requires a key to be locked onto and unlocked from the rack 204 in order to prevent the cargo box 202 from being stolen. It is contemplated that other types of locking mechanisms are considered, and that the locking mechanism could alternatively be located on sides or on the bottom of the rack 204.

The rack 204 connects to the frame 30 by three rack brackets 210, 212, and 214. Each of the rack brackets 210, 212, and 214 is fastened to a corner of the support member 206. It is contemplated that some or all of the rack brackets 210, 212, and 214 could be located on sides of the support member 206. It is also contemplated that more rack brackets could be used to connect the rack 204 to the frame 30. Alternatively the rack brackets 210, 212, and 214 could be integrally formed with the support member 206. The rack brackets 210, 212, and 214 are elongated members having a tip for connecting the support member 206 to one of the other portions of the mounting system as described below. The rack brackets 210 and 212 extend away from an inside of the support member 206, while the rack bracket 214 extends toward the inside of the support member 206. When the cargo box 202 is mounted onto the rack 204, the rack bracket 214 is hidden by the cargo box 202.

Figure 5A:
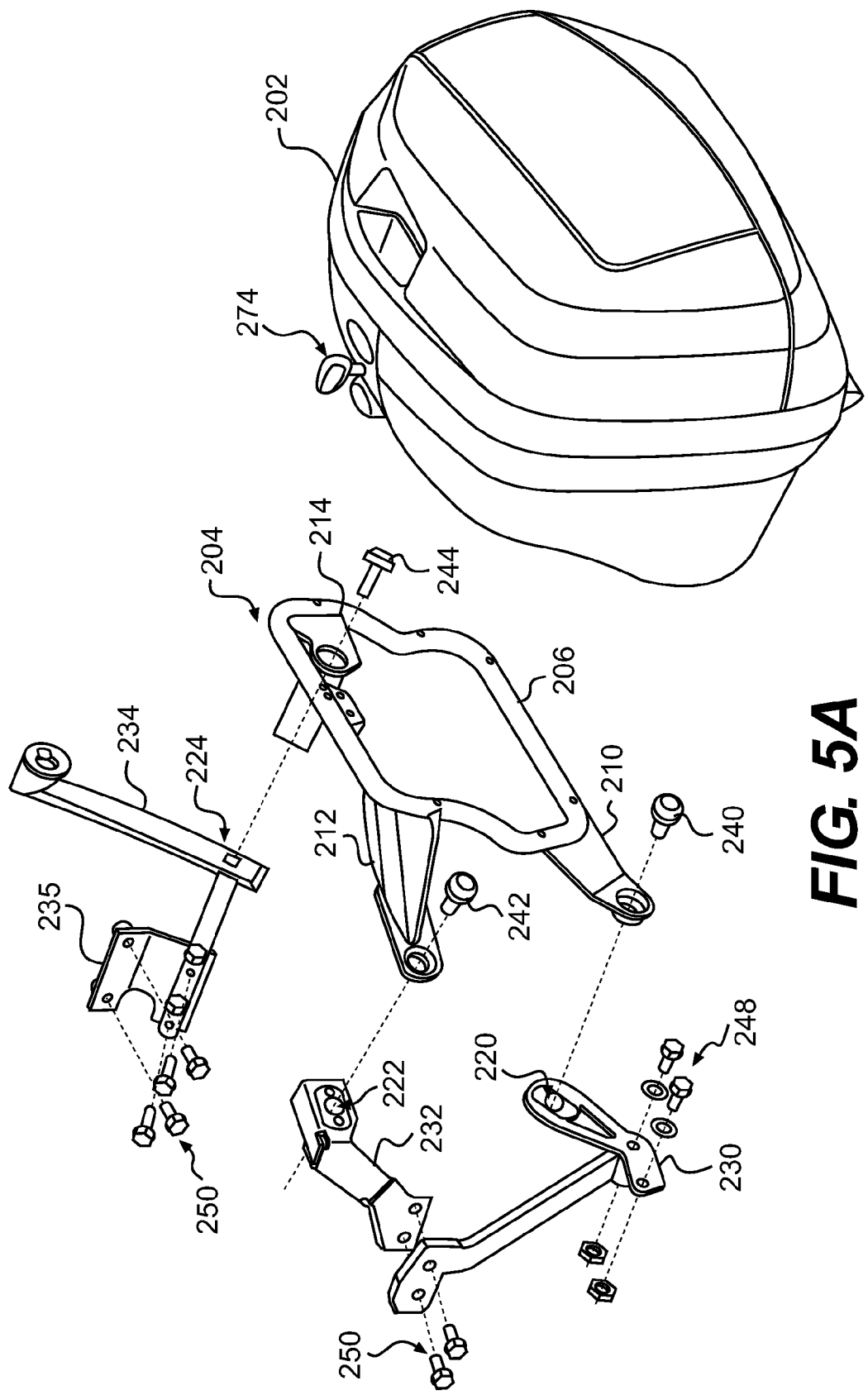
FIG. 5A is an exploded view of a system for mounting a cargo box or a saddle bag onto a left side of the frame of the vehicle of FIG. 1, with the cargo box shown.
Figure 5B:
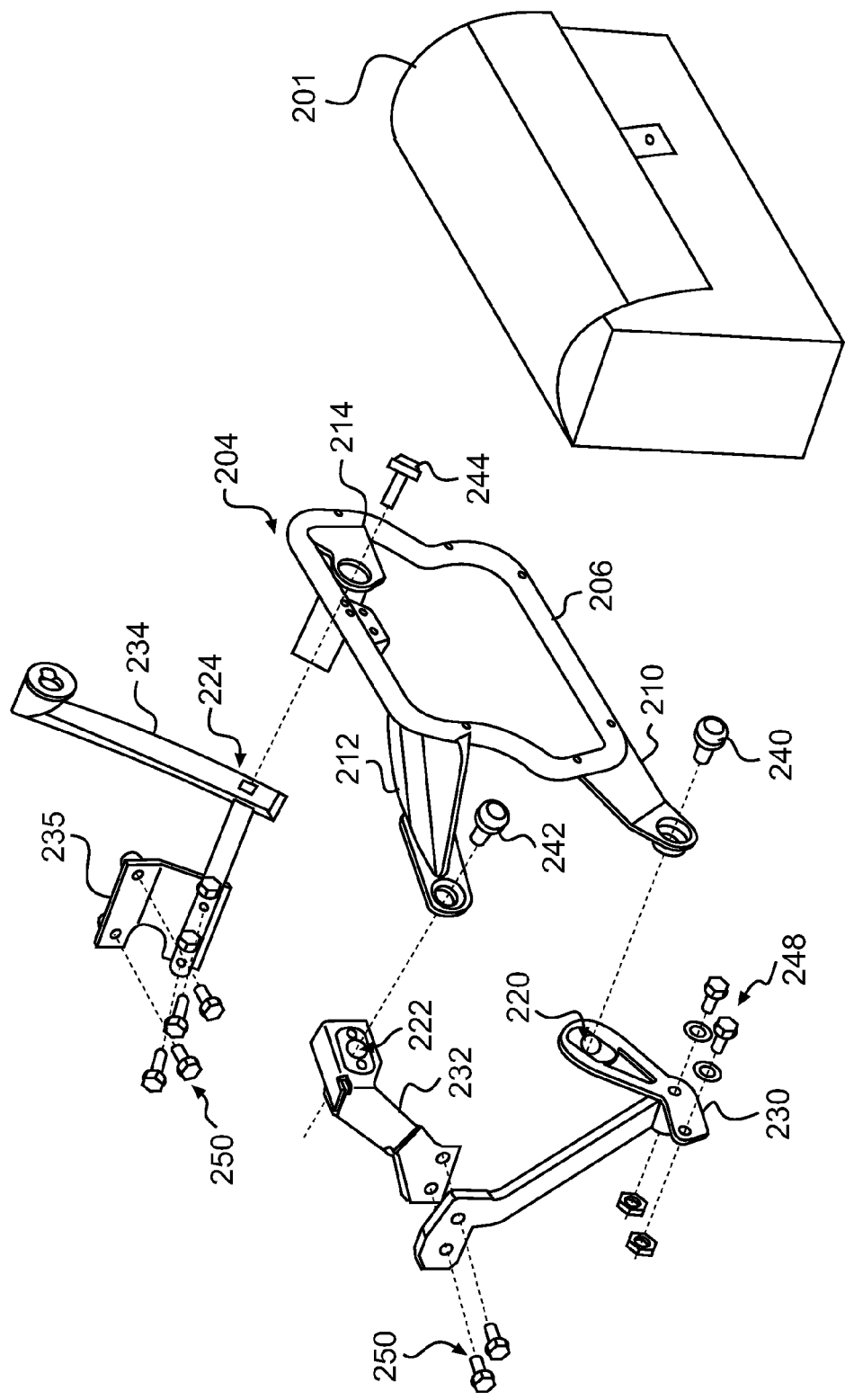
FIG. 5B is an exploded view of a system for mounting a cargo box or a saddle bag onto a left side of the frame of FIG. 1 of the vehicle, with the saddle bag shown.

Referring now to FIGS. 5A, 5B, and 7, the mounting system for the cargo box 202 (FIG. 5A) and a saddle bag 201 (FIG. 5B) onto the frame 30 (shown in FIG. 7) of the three-wheel vehicle 20 will be described. The connection of the rack 204 to the frame 30 is achieved by connecting the three rack brackets 210, 212, and 214 to the frame 30 at three attachment points 220, 222, and 224. The attachment point 220 connects the rack bracket 210 to an intermediate bracket 230. The intermediate bracket 230 is connected to a foot peg holder 260 which holds the foot peg 102. It is contemplated that the intermediate bracket 230 could be integrally formed with the foot peg holder 260 (shown in FIG. 4). The attachment point 222 is located behind a cover 280 (shown in FIG. 4) and connects the rack bracket 212 to an intermediate bracket 232. The intermediate bracket 232 connects to the intermediate bracket 230. The attachment point 224 connects the rack bracket 214 to an intermediate bracket 234 in the form of a turn signal holder 234. It is contemplated that the intermediate bracket 234 could not be the turn signal holder 234, and could be a bracket connected to a turn signal holder adapted to receive such a bracket. The attachment point 224 is located behind the cargo box 202 when the cargo box 202 is mounted onto the three-wheel vehicle 20, thus preventing access to the rack bracket 214. To achieve connection at the attachment point 222, the cover 280 comprises an aperture 274 to connect the rack bracket 212 to the intermediate bracket 232 disposed behind the cover 280. It is contemplated that the attachment point 222 could be located on a portion of the frame 30 not located behind the cover 280.

The rack brackets 210, 212, and 214 are connected to the intermediate brackets 230, 232, and 234 at the attachment points 220, 222, and 224 by quarter-turn fasteners 240, 242, and 244. The quarter-turn fasteners 240, 242, and 244 allow a user to easily remove the rack 204 from the intermediate brackets 230, 232, and 234. It is contemplated that other types of fasteners such as bolts, screws or nuts could be used.

The intermediate bracket 230 has an elongated part (or leg) for connecting to the intermediate bracket 232 by fasteners 250. The intermediate bracket 230 connects to the foot peg holder 260 with nut and bolt fasteners 248, and connects to the rack bracket 210 by the quarter-turn fastener 240. The intermediate bracket 232 is a bracket shaped to connect to the intermediate bracket 230 by the fasteners 250. The intermediate bracket 232 connects to the rack bracket 210 by the quarter-turn fastener 242. It is contemplated that the intermediate bracket 232 could also be connected directly to the frame 30. The intermediate bracket 234 connects to the rack bracket 214 with the quarter-turn fastener 244. Furthermore, the intermediate bracket 234 has a plate 253 for connecting to the frame 30 by the fasteners 250. The intermediate brackets 230 and 232 can be simultaneously removed when the cargo box 202 and the rack 204 are not mounted onto the frame 30 in order to leave the three-wheel vehicle 20 free of aesthetically displeasing parts. Since the intermediate bracket 234 is the turn signal holder 234, it can remain on the three-wheel vehicle 20 when the cargo box 202 is removed from the rack 204, or be replaced with another more aesthetically pleasing turn signal holder.

Figure 6:
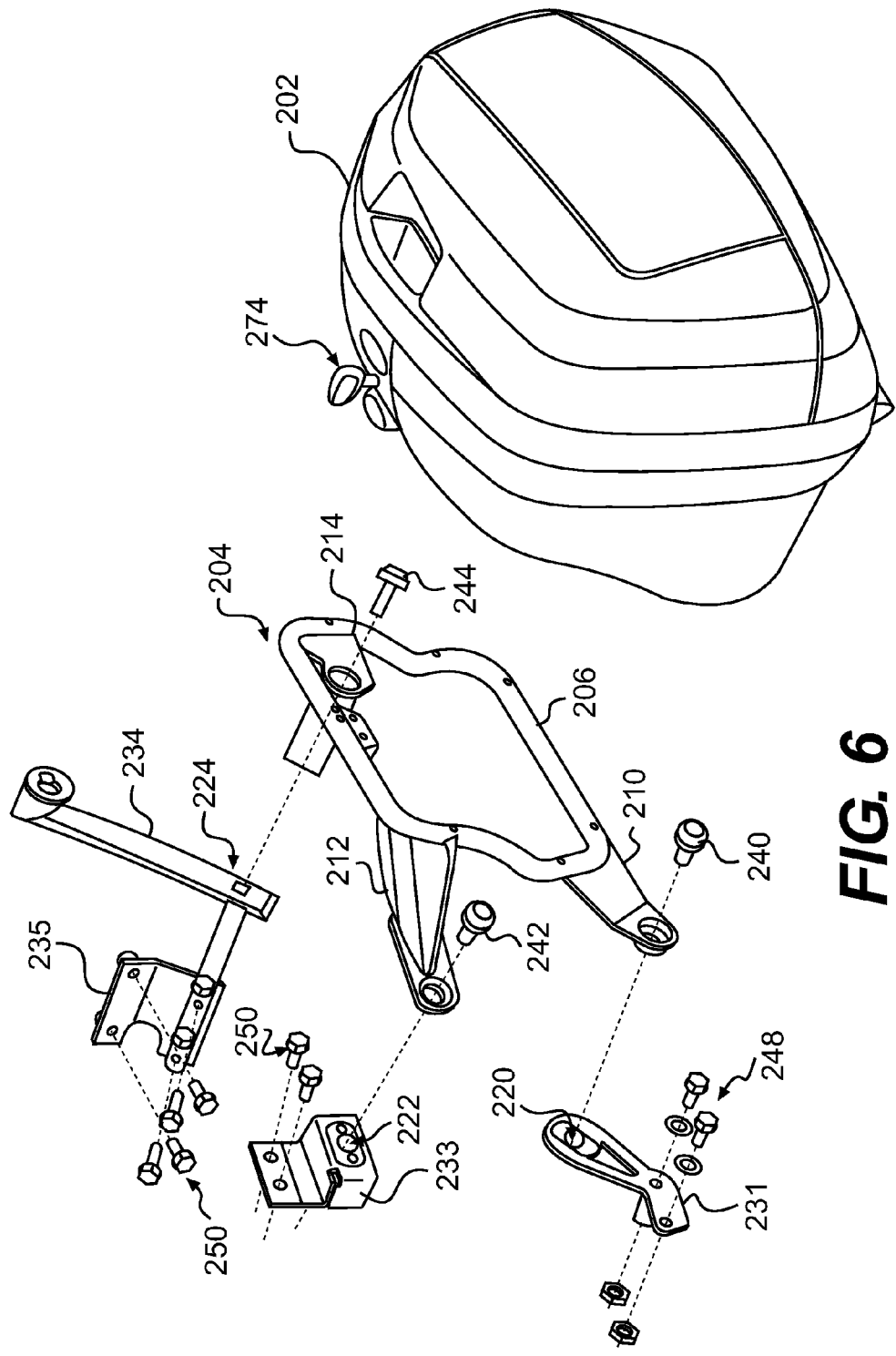
FIG. 6 is an exploded view of an alternative version of the mounting system of FIG. 5A.

In an alternative embodiment shown in FIG. 6, the mounting system has an intermediate bracket 233 replacing the intermediate bracket 232, and an intermediate bracket 231 replacing the intermediate bracket 230. The intermediate bracket 233 is shaped to directly connect to the frame 30 instead of directly connecting to the intermediate bracket 230. As a consequence, the intermediate bracket 231 does not comprise the elongated part (or leg) of the intermediate bracket 230 for connecting to the intermediate bracket 232. The intermediate bracket 231 connects directly to the foot peg holder 260 by the nut and bolt fasteners 248. The intermediate bracket 233 connects to the frame by the fasteners 250.

The mounting system can be part of a kit, ready to be assembled onto a three-wheel vehicle which would not have a pair of cargo boxes 202. Different kits for mounting the cargo box 202 onto a the three-wheel vehicle will now be described. It is contemplated that a user having a three-wheel vehicle with no cargo boxes 202 would install two kits, one for each side of the three-wheel vehicle, in order to balance the three-wheel vehicle A first kit for mounting the cargo box 202 to a three-wheel vehicle with no cargo boxes 202 will now be described. The first kit is most suitable for a three-wheel vehicle having the turn signal holder being the intermediate bracket 234. The first kit comprises the rack 204 having the support member 206 and the rack brackets 210, 212 and 214 fastened to the support member 206, the intermediate brackets 230, 232, and the quarter-turn fasteners 240, 242, and 244 for mounting the rack brackets 210, 212, and 214 to the intermediate brackets 230, 232, and 234 (the intermediate bracket 234 being already installed on the three-wheel vehicle). The first kit also comprises the fasteners 250, the cover 280 and the cargo box 202. It is contemplated that the quarter-turn fasteners 240, 242, and 244, the cover 280, the fasteners 248 and 250, and the cargo box 202 could not be part of the first kit. It is also contemplated that the rack 204 could not be assembled, and that the first kit would have fasteners for fastening the rack brackets 210, 212, and 214 to the support member 206. Finally, it is contemplated that the cargo box 202 could be replaced by the saddle bag 201. A user having the first kit firstly mounts the intermediate bracket 232 to the intermediate bracket 230 using the fasteners 250, secondly mounts the intermediate bracket 230 to the foot peg holder 260 using the quarter-turn fastener 248, thirdly mounts the cover 280 on top of the intermediate bracket 232 such that the aperture 274 is aligned with the attachment point 222 of the intermediate bracket 232, and fourthly mounts the rack brackets 210, 212, and 214 to the intermediate brackets 230, 232, and 234 by using the quarter-turn fasteners 240, 242, and 244.

An alternative version of the first kit has the intermediate bracket 233 (as seen in FIG. 6) adapted to connect directly to the frame 30 instead of the intermediate bracket 232. This alternative version of the first kit also has the intermediate bracket 231 replacing the intermediate bracket 230. A user having this alternative version of the first kit first mounts the intermediate bracket 233 to the frame 30 using the fasteners 250, mounts the intermediate bracket 231 to the foot peg holder 260 using the nut and bolt fasteners 248, and then mounts the rack brackets 210, 212, and 214 to the intermediate brackets 231, 233, and 234 by using the quarter-turn fasteners 240, 242, and 244.

In another alternative version of the first kit, the first kit does not comprise the intermediate brackets 230 and 232, and the rack 204 is adapted to be mounted to the frame 30 or to intermediate brackets of the frame 30.

A second kit for mounting the cargo box 202 to a three-wheel vehicle will be described. The second kit is most suitable for a three-wheel vehicle having an original turn signal holder not adapted to receive the rack bracket 214 or any other bracket that could be used for mounting the rack 204 onto the frame 30. Therefore the second kit includes the intermediate bracket 234 being the turn signal holder to replace the original turn signal holder on the three-wheel vehicle. The second kit comprises the rack 204 having the support member 206 and the rack brackets 210, 212 and 214 fastened to the support member 206, the intermediate brackets 230, 232, and 234, and the quarter-turn fasteners 240, 242, and 244. The second kit also comprises the fasteners 248 and 250, the cover 280, and the cargo box 202. It is contemplated that the quarter-turn fasteners 240, 242, and 244, the cover 280, the fasteners 248 and 250 and the cargo box 202 could not be part of the second kit. It is also contemplated that the rack 204 could not be assembled, and that the second kit would have fasteners for fastening the rack brackets 210, 212, and 214 to the support member 206. Finally, it is contemplated that the cargo box 202 could be replaced by the saddle bag 201. A user having the second kit mounts the intermediate brackets 230 and 232, and the cover 280 similarly to what a user would do for the first kit. The user then removes the original turn signal holder and replaces it by the intermediate bracket 234. More specifically, the user mounts the intermediate bracket 234 to the frame 30 at the plate 253 using the fasteners 250. Finally, the user mounts the rack brackets 210, 212, and 214 to the intermediate brackets 230, 232, and 234 by using the quarter-turn fasteners 240, 242, and 244.

An alternative version of the second kit has the intermediate bracket 233 (as seen in FIG. 6) adapted to connect directly to the frame 30 instead of the intermediate bracket 232. This alternative version of the second kit also has the intermediate bracket 231 replacing the intermediate bracket 230. A user having this alternative version of the second kit mounts the intermediate bracket 233 to the frame 30 using the fasteners 250, mounts the intermediate bracket 231 to the foot peg holder 260 using the nut and bolt fasteners 248, and mounts the intermediate bracket 234 as described above for the second kit.

In another alternative version of the second kit, the second kit does not comprise the intermediate brackets 230, 232 and 234, and the rack 204 is adapted to be mounted to the frame 30 or to intermediate brackets of the frame 30.

A third kit for mounting the cargo box 202 to a three-wheel vehicle will be described. The third kit is most suitable for a three-wheel vehicle having the turn signal holder not being the intermediate bracket 234, but having a turn signal holder being adapted to connect to a turn signal holder adapter bracket (not shown). The third kit comprises the rack 204 having the support member 206 and the rack brackets 210, 212, and 214 fastened to the support member 206, the intermediate brackets 230, 232, the turn signal holder adapter bracket, and the quarter-turn fasteners 240, 242, and 244. The third kit also comprises the fasteners 248 and 250, the cover 280 and the cargo box 202. It is contemplated that the quarter-turn fasteners 240, 242, and 244, the cover 280, the fasteners 248 and 250 and the cargo box 202 could not be part of the third kit. It is also contemplated that the rack 204 could not be assembled, and that the third kit would have fasteners for fastening the rack brackets 210, 212, and 214 to the support member 206. The turn signal holder adapter bracket is a bracket adapted to connect on one hand to the turn signal holder and on the other hand to the rack 204. Finally, it is contemplated that the cargo box 202 could be replaced by the saddle bag 201. A user having the third kit mounts the intermediate brackets 230 onto the foot peg holder 260 and mounts the turn signal holder adapter bracket onto the turn signal holder using fasteners (not shown). A user then mounts the intermediate brackets 230 and 232 similarly to the first kit, before securing the rack brackets 210, 212, and 214 to the intermediate brackets 230, 232, and the turn signal holder adapter bracket using the quarter-turn fasteners 240, 242, and 244.

An alternative version of the third kit has the intermediate bracket 233 (as seen in FIG. 6) adapted to connect directly to the frame 30 instead of the intermediate bracket 232. The kit also has the intermediate bracket 231 instead of the intermediate bracket 230. A user having this alternative version of the third kit mounts the intermediate brackets 231 and 233, as described in the alternative version of the first kit, and mounts the turn signal holder adapter bracket to the foot peg holder 260 using the nut and bolt fasteners 248, and mounts the intermediate bracket 234 as described above for the third kit.

In another alternative version of the third kit, the third kit does not comprise the intermediate brackets 230, 232 and the turn signal holder adapter bracket, and the rack 204 is adapted to be mounted to the frame 30 or to intermediate brackets of the frame 30.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A kit for mounting at least one of a cargo box and a bag to a vehicle comprising:
   a rack having:
      a support member; and
      at least first, second, and third rack brackets attached to the support member, the third rack bracket being adapted to connect to a turn signal holder;
   first, second and third intermediate brackets adapted to connect the at least first, second, and third rack brackets, the first intermediate bracket being adapted to connect the first rack bracket to a foot peg holder, and the third intermediate bracket being part of a turn signal holder; and
   at least two fasteners for fastening the first rack bracket to the foot peg holder and third rack bracket to the turn signal holder.

2. The kit of claim 1, wherein the second rack bracket is adapted to connect directly to the frame.

3. The kit of claim 1, wherein the second rack bracket is adapted to connect to a bracket connected to the frame.

4. The kit of claim 1, wherein the second intermediate bracket is adapted to connect the second rack bracket directly to the frame.

5. The kit of claim 1, wherein the second intermediate bracket is adapted to connect the second rack bracket to the first intermediate bracket.

6. The kit of claim 1, further comprising a cover to be mounted to the vehicle, the cover having an aperture such that when the kit is mounted to the vehicle, the second rack bracket passes at least in part through the aperture to connect to the second intermediate bracket disposed behind the cover.

7. The kit of claim 1, further comprising at least three quarter-turn fasteners for connecting the first, second, and third rack brackets to the first, second, and third intermediate brackets.

8. A vehicle comprising:
   a frame having a front portion and a rear portion;
   an engine supported by the frame;
   at least two wheels connected to the frame, at least one of the at least two wheels being operatively connected to the engine to propel the vehicle;
   a steering assembly supported by the frame and being operatively connected to at least one of the at least two wheels to steer the vehicle;
   intermediate brackets connected to the rear portion of the frame; and
   a rack, the rack being removably connected to the intermediate brackets via fasteners for removably connecting the rack to the rear portion of the frame, the rack being adapted to attach at least one of a cargo box and a bag to the vehicle; and
   a cover having an aperture through which at least a portion of one of the fasteners and a corresponding one of the intermediate brackets pass.

9. The vehicle of claim 8, wherein at least one of the intermediate brackets is removably connected to the frame.

10. The vehicle of claim 8, wherein at least one of the intermediate brackets is permanently connected to the frame.

11. The vehicle of claim 8, further comprising one of a cargo box and a bag attached on the rack, the one of the cargo box and the bag having a lock for locking the at least one of the cargo box and the bag on the rack.

12. The vehicle of claim 8, wherein the intermediate brackets comprise first, second and third intermediate brackets; and further comprising a cover having an aperture, a portion of the rack being received at least in part in the aperture to connect to one of the intermediate brackets disposed behind the cover.

13. The vehicle of claim 8, wherein the intermediate brackets comprise first, second and third intermediate brackets; and
wherein the first intermediate bracket is connected to a foot peg holder, the second intermediate bracket is directly connected to the frame, the third intermediate bracket is part of a turn signal holder, and the rack is connected to at least one of the first, second, and third intermediate brackets by at least a quarter-turn fastener.

14. The vehicle of claim 8, wherein the intermediate brackets comprise first, second and third intermediate brackets; and
wherein the first intermediate bracket is connected to a foot peg holder, the second intermediate bracket is directly connected to the first intermediate bracket, the third intermediate bracket is part of a turn signal holder, and the rack is connected to at least one of the first, second, and third intermediate brackets by at least a quarter-turn fastener.

15. The vehicle of claim 8, further comprising one of a cargo box and a bag attached on the rack, the one of the cargo box and the bag being disposed in front of at least one of the quarter-turn fasteners to prevent access to the at least one of the quarter-turn fasteners.

16. A vehicle comprising:
a frame having a front portion and a rear portion;
an engine supported by the frame;
at least two wheels connected to the frame, at least one of the at least two wheels being operatively connected to the engine to propel the vehicle;
a steering assembly supported by the frame and being operatively connected to at least one of the at least two wheels to steer the vehicle;
a straddle seat disposed on the frame;
a turn signal holder connected to the rear portion of the frame;
a turn signal connected to the turn signal holder;
a foot peg holder mounted on the frame rearwardly of the steering assembly and vertically lower than the turn signal holder;
a foot peg connected to the foot peg holder; and
a rack for one of a cargo box and a bag, the rack being removably connected to the rear portion of the frame at at least first and second attachment points, and the first attachment point being associated with the turn signal holder.

17. The vehicle of claim 16, wherein the second attachment point is associated with the foot peg holder.

18. The vehicle of claim 17, wherein the rack further comprises at least first, second rack brackets, the first rack bracket being connected to the turn signal holder at the first attachment point, the second rack bracket being connected to the foot peg holder at the second attachment point.

19. The vehicle of claim 16, further comprising a cover having an aperture;
wherein the rack has a third rack bracket; and
wherein the third rack bracket passes at least in part through the aperture to connect to one of the frame and the foot peg holder at a third attachment point located behind the cover.

* * * * *